(12) United States Patent
Bonnet et al.

(10) Patent No.: US 9,616,642 B2
(45) Date of Patent: *Apr. 11, 2017

(54) MULTILAYER PIPE FOR TRANSPORTING WATER OR GAS

(75) Inventors: Anthony Bonnet, Beaumont le Roger (FR); Michael Werth, Bernay (FR)

(73) Assignee: Arkema France, Colombes (FR)

(*) Notice: Subject to any disclaimer, the term of this patent is extended or adjusted under 35 U.S.C. 154(b) by 1232 days.

This patent is subject to a terminal disclaimer.

(21) Appl. No.: 11/445,598

(22) Filed: Jun. 2, 2006

(65) Prior Publication Data

US 2006/0275572 A1    Dec. 7, 2006

Related U.S. Application Data

(60) Provisional application No. 60/716,429, filed on Oct. 17, 2005.

(30) Foreign Application Priority Data

Jun. 2, 2005  (FR) ........................ 05.05603
Jun. 17, 2005 (FR) ........................ 05.06189

(51) Int. Cl.
*C08L 51/00* (2006.01)
*B32B 27/28* (2006.01)
(Continued)

(52) U.S. Cl.
CPC ............ *B32B 27/28* (2013.01); *B32B 1/08* (2013.01); *B32B 27/08* (2013.01); *B32B 27/304* (2013.01);
(Continued)

(58) Field of Classification Search
CPC ...... C08F 259/08; C08F 14/22; C08L 51/003; C09J 127/16
(Continued)

(56) References Cited

U.S. PATENT DOCUMENTS 4,129,617 A * 12/1978 Machi et al. ................ 522/120
4,308,359 A * 12/1981 Buning ......................... 525/276
(Continued)

FOREIGN PATENT DOCUMENTS

WO    WO2006/131563    12/2006

*Primary Examiner* — Ellen S Wood
(74) *Attorney, Agent, or Firm* — Thomas F. Roland

(57) ABSTRACT

The invention relates to a multilayer pipe which comprises (in the following order, from the inside of the pipe outwards):

optionally, a layer $C_1$ of a fluoropolymer;
a layer $C_2$ of a fluoropolymer onto which at least one unsaturated monomer has been radiation-grafted, optionally blended with a fluoropolymer;
optionally, an adhesion tie layer $C_3$, this layer $C_3$ being directly attached to the layer $C_2$ containing the radiation-grafted fluoropolymer;
a layer $C_4$ of a polyolefin optionally blended with a functionalized polyolefin, directly attached to the optional layer $C_3$ or else to the layer $C_2$;
optionally, a barrier layer $C_5$; and
optionally, a layer $C_6$ of a polyolefin.

15 Claims, 1 Drawing Sheet

(51) Int. Cl.
  *B32B 1/08* (2006.01)
  *B32B 27/08* (2006.01)
  *B32B 27/30* (2006.01)
  *B32B 27/32* (2006.01)
  *F16L 9/12* (2006.01)
  *F16L 9/133* (2006.01)
  *F16L 11/04* (2006.01)

(52) U.S. Cl.
  CPC .......... *B32B 27/322* (2013.01); *B32B 27/327* (2013.01); *F16L 9/121* (2013.01); *F16L 9/133* (2013.01); *F16L 11/045* (2013.01); *B32B 2250/246* (2013.01); *B32B 2307/308* (2013.01); *B32B 2307/714* (2013.01); *B32B 2597/00* (2013.01); *F16L 2011/047* (2013.01); *Y10T 428/1393* (2015.01)

(58) Field of Classification Search
  USPC .... 428/34.1, 35.7, 36.6, 36.9; 138/118, 137, 138/140, 141, DIG. 1
  See application file for complete search history.

(56) References Cited

U.S. PATENT DOCUMENTS

| | | | | |
|---|---|---|---|---|
| 5,576,106 A | * | 11/1996 | Kerbow et al. | 428/403 |
| 5,736,610 A | * | 4/1998 | Nishi et al. | 525/276 |
| 5,827,587 A | * | 10/1998 | Fukushi | 428/36.6 |
| 5,958,532 A | * | 9/1999 | Krause et al. | 428/36.3 |
| 5,993,922 A | * | 11/1999 | Babrowicz et al. | 428/35.7 |
| 6,089,278 A | * | 7/2000 | Nishino et al. | 138/137 |
| 6,176,268 B1 | * | 1/2001 | Hsich et al. | 138/137 |
| 6,179,008 B1 | * | 1/2001 | Kawazura et al. | 138/125 |
| 6,263,920 B1 | * | 7/2001 | Hsich et al. | 138/137 |
| 6,423,798 B2 | * | 7/2002 | Wheland et al. | 526/206 |
| 6,476,125 B1 | * | 11/2002 | Iura et al. | 525/66 |
| 6,511,724 B1 | * | 1/2003 | Siour et al. | 428/36.91 |
| 6,528,135 B1 | * | 3/2003 | Egret et al. | 428/36.6 |
| 6,552,099 B2 | * | 4/2003 | Yamamoto et al. | 522/156 |
| 6,616,994 B2 | * | 9/2003 | Van Schaftingen et al. | 428/35.7 |
| 6,645,590 B1 | * | 11/2003 | Spohn | 428/36.9 |
| 6,655,414 B2 | * | 12/2003 | Nishi et al. | 138/137 |
| 6,849,314 B2 | * | 2/2005 | Jing et al. | 428/36.91 |
| 7,241,817 B2 | * | 7/2007 | Bonnet et al. | 522/156 |
| 2002/0104575 A1 | * | 8/2002 | Nishi et al. | 138/137 |
| 2002/0134449 A1 | * | 9/2002 | Nishi et al. | 138/121 |
| 2002/0150763 A1 | * | 10/2002 | Silagy et al. | 428/421 |
| 2003/0106602 A1 | * | 6/2003 | Hsich et al. | 138/137 |
| 2003/0198769 A1 | * | 10/2003 | Jing et al. | 428/36.91 |
| 2004/0023037 A1 | * | 2/2004 | Baumert et al. | 428/421 |
| 2005/0003126 A1 | * | 1/2005 | Ito et al. | 428/36.9 |
| 2005/0118372 A1 | * | 6/2005 | Bonnet et al. | 428/35.7 |
| 2005/0170121 A1 | * | 8/2005 | Bonnet et al. | 428/36.91 |
| 2005/0203203 A1 | * | 9/2005 | Bonnet et al. | 522/149 |
| 2007/0149638 A1 | * | 6/2007 | Bonnet et al. | 522/113 |

* cited by examiner

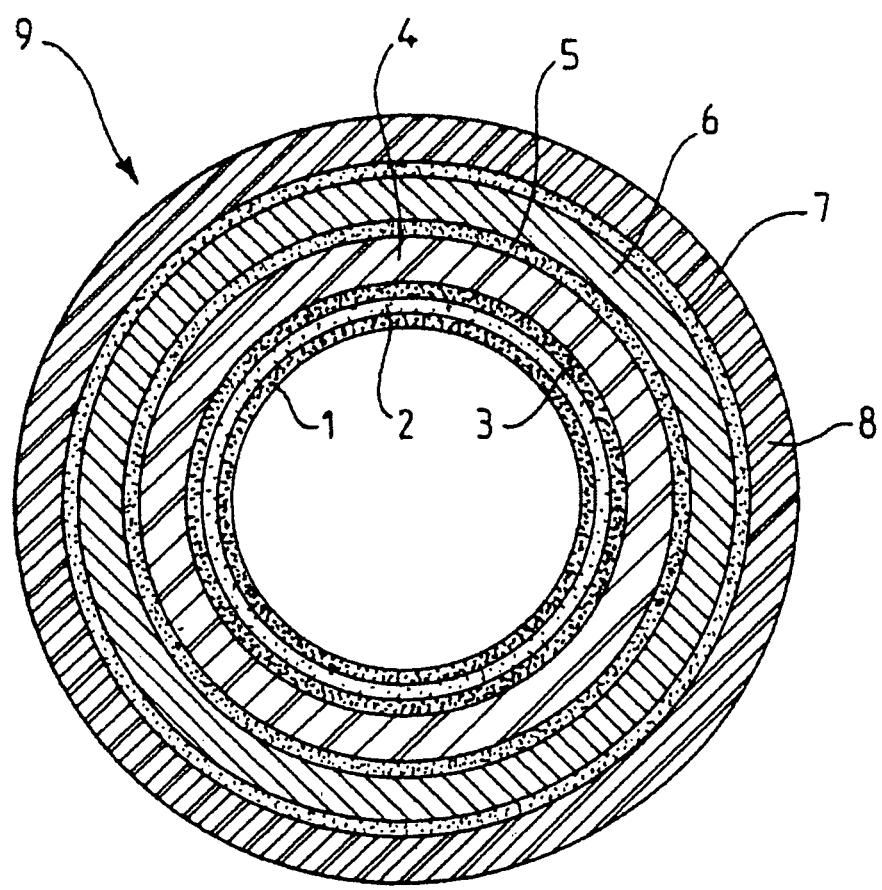

MULTILAYER PIPE FOR TRANSPORTING WATER OR GAS

This application claims benefit, under U.S.C. §119(a) of French National Applications Number FR 05.05603, filed Jun. 2, 2005, and FR 05.06189 filed Jun. 17, 2005; and also claims benefit, under U.S.C. §119(e) of U.S. provisional application 60/716,429, filed Oct. 17, 2005, incorporated herein by reference.

FIELD OF THE INVENTION

The present invention relates to a multilayer pipe comprising a layer of a fluoropolymer onto which an unsaturated monomer has been radiation-grafted and a layer of a polyolefin. The polyolefin may be a polyethylene, especially high-density polyethylene (HDPE) or a crosslinked polyethylene (denoted by XPE). The pipe can be used for transporting liquids, in particular hot water or gas. The invention also relates to the uses of this pipe.

BACKGROUND OF THE INVENTION

Steel or cast iron pipes are being increasingly replaced with equivalents made of plastic.

Polyolefins, especially polyethylenes, are very widely used thermoplastics as they exhibit good mechanical properties, they can be easily converted and allow pipes to be welded together easily. Polyolefins are widely used for the manufacture of pipes for transporting water or town gas. When the gas is under a high pressure (>10 bar or higher), it is necessary for the polyolefin to mechanically withstand the stresses exerted by the pressurized gas.

In addition, the polyolefin may be exposed to an aggressive chemical environment. For example, in the case of water transport, the water may contain additives or aggressive chemicals (for example ozone, and chlorinated derivatives, used for the purification of water such as bleach, which are oxidizing, especially when hot). These additives or chemicals may damage the polyolefin over the course of time, especially when the water transported is at a high temperature (this is the case in heating circuits or in water systems for which the water is heated to a high temperature in order to eliminate germs, bacteria or micro organisms). One problem that the invention aims to solve is therefore to develop a chemically resistant pipe.

Another problem that the invention aims to solve is that the pipe must have barrier properties. The term "barrier" is understood to mean the fact that the pipe reduces the rate of migration into the transported fluid of contaminants present in the external environment or else contaminants (such as antioxidants or polymerization residues) present in the polyolefin. The term "barrier" also means the fact that the pipe reduces the rate of migration of oxygen or of additives present in the transported fluid into the polyolefin layer.

It is also necessary for the tube to have good mechanical properties, in particular good impact strength, and for the layers to adhere well to one another (no delamination).

The Applicant has developed a multilayer pipe that solves the stated problems. This pipe has in particular good chemical resistance to the transported fluid and the abovementioned barrier properties.

Document EP 1484346 published on 8 Dec. 2004 describes multilayer structures that include a radiation-grafted fluoropolymer. The structures may be in the form of bottles, tanks, containers or hoses. The structure of the multilayer pipe according to the invention does not appear in this document.

Document EP 1541343 published on 8 Jun. 2005 describes a multilayer structure based on a fluoropolymer modified by radiation grafting in order to store or transport chemicals. In this application, the term "chemicals" should be understood to mean products that are corrosive or dangerous, or else products whose purity has to be maintained. The structure of the multilayer pipe according to the invention does not appear in this document.

Document U.S. Pat. No. 6,016,849 published on 25 Jul. 1996 describes a plastic pipe in which the adhesion between the internal layer and the external protective layer is between 0.2 and 0.5 N/mm. There is no mention of a fluoropolymer modified by radiation grafting.

Documents US 2004/0206413 and WO 2005/070671 describe a multilayer pipe comprising a metal casing. There is no mention of a fluoropolymer modified by radiation grafting.

SUMMARY OF THE INVENTION

The invention relates to a multilayer pipe as defined in claim 1. It also relates to the use of the pipe in transporting water or a gas.

In the case where the pipe contains a C-XPE type layer, the invention discloses a process for producing the said pipe.

The invention may be better understood on reading the following detailed description of non-limiting illustrative examples of the invention and on examining the appended figure. The prior French applications FR 05/05603 and FR 05/06189 and provisional application U.S. 60/716,429, the priority of which is claimed, are incorporated for reference.

BRIEF DESCRIPTION OF THE DRAWINGS

FIG. 1 shows a cross-sectional view of a multilayer pipe 9 according to one of the embodiments of the invention. It consists of a cylindrical tube having several concentric layers, referenced 1 to 8.
- layer 1: fluoropolymer layer $C_1$;
- layer 2: layer $C_2$ of fluoropolymer modified by radiation grafting;
- layer 3: adhesion tie layer $C_3$;
- layer 4: polyolefin layer $C_4$;
- layer 5: adhesion tie layer;
- layer 6: barrier layer $C_5$;
- layer 7: adhesion tie layer; and
- layer 8: layer $C_6$ of a polyolefin.

The layers are arranged one against the other in the order indicated 1→8.

DETAILED DESCRIPTION OF THE INVENTION

As regards the radiation-grafted fluoropolymer, this is obtained by a radiation grafting process in which an unsaturated monomer is grafted onto a fluoropolymer. To simplify matters, this will be referred to in the remainder of the application as a radiation-grafted fluoropolymer.

The fluoropolymer is blended beforehand with the unsaturated monomer by any melt-blending technique known in the prior art. The blending step is carried out in any blending device, such as extruders or mixers used in the thermoplastics industry. Preferably, an extruder will be used to make the blended compound in the form of granules. The grafting therefore takes place on a compound (throughout the mass) and not on the surface of a powder, as described for example in document U.S. Pat. No. 5,576,106.

Next, the fluoropolymer/unsaturated monomer compound is irradiated (beta β or gamma γ irradiation) in the solid state using an electron or photon source with an irradiation dose of between 10 and 200 kGray, preferably between 10 and 150 kGray. Advantageously, the dose ranges between 2 and 6 Mrad and preferably between 3 and 5 Mrad. It is particularly preferred to carry out the irradiation in a cobalt 60 bomb. The compound may for example be put into polyethylene bags, the air is then expelled therefrom, the bags are sealed and the whole assembly irradiated.

The grafted unsaturated monomer content is, by weight, between 0.1 and 5% (that is to say the grafted unsaturated monomer corresponds to 0.1 to 5 parts per 99.9 to 95 parts of fluoropolymer), advantageously from 0.5 to 5% and preferably from 0.9 to 5%. The grafted unsaturated monomer content depends on the initial content of the unsaturated monomer in the fluoropolymer/unsaturated monomer compound to be irradiated. It also depends on the efficiency of the grafting, and therefore, particularly, on the duration and the energy of the irradiation.

Any unsaturated monomer that has not been grafted and the residues released by the grafting, especially HF, may then be optionally removed. The latter step may be necessary if the non-grafted unsaturated monomer is liable to impair the adhesion or cause toxicological problems. This operation may be carried out using techniques known to those skilled in the art. A vacuum degassing operation may be applied, optionally applying heating at the same time. It is also possible to dissolve the radiation-grafted fluoropolymer in a suitable solvent, such as for example N-methylpyrrolidone, and then to precipitate the polymer in a non-solvent, for example in water or in an alcohol, or else to wash the radiation-grafted fluoropolymer using a solvent that is inert with respect to the fluoropolymer and to the grafted functional groups. For example, when maleic anhydride is grafted, it is possible to wash with chlorobenzene.

One of the advantages of this radiation grafting process is that it is possible to obtain higher grafted unsaturated monomer contents than with the conventional grafting processes using a radical initiator. Thus, with this grafting process, it is typically possible to obtain contents of greater than 1% (one part of unsaturated monomer per 99 parts of fluoropolymer), or even greater than 1.5%, something that is not possible with a conventional grafting process carried out in an extruder.

Moreover, the radiation grafting takes place "cold" typically at temperatures below 100° C., or even below 50° C., so that the fluoropolymer/unsaturated monomer compound is not in the melt state, as in the case of a conventional grafting process carried out in an extruder. One essential difference is therefore that, in the case of a semicrystalline fluoropolymer (as is the case with PVDF for example), the grafting takes place in the amorphous phase and not in the crystalline phase, whereas homogeneous grafting takes place in the case of melt grafting in an extruder. The unsaturated monomer is therefore not distributed along the fluoropolymer chains in the same way in the case of radiation grafting as in the case of grafting carried out in an extruder. The modified fluoropolymer therefore has a different distribution of unsaturated monomer among the fluoropolymer chains compared with a product obtained by grafting carried out in an extruder.

During the grafting step, it is preferable to prevent oxygen from being present. It is therefore possible to remove the oxygen by flushing the fluoropolymer/unsaturated monomer compound with nitrogen or argon.

The fluoropolymer modified by radiation grafting has the very good chemical resistance and very good oxidation resistance and the very good thermomechanical properties of the fluoropolymer before its modification.

As regards the fluorinated polymer, this denotes any polymer having in its chain at least one monomer chosen from compounds that contain a vinyl group capable of opening in order to be polymerized and that contains, directly attached to this vinyl group, at least one fluorine atom, a fluoroalkyl group or a fluoroalkoxy group.

As examples of monomers, mention may be made of vinyl fluoride; vinylidene fluoride (VDF, $CH_2=CF_2$); trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers, such as perfluoro(methyl vinyl) ether (PMVE), perfluoro(ethyl vinyl) ether (PEVE) and perfluoro(propyl vinyl) ether (PPVE); perfluoro (1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_n CH_2OCF=CF_2$ in which n is 1, 2, 3, 4 or 5; the product of formula $R_1CH_2OCF=CF_2$ in which $R_1$ is hydrogen or $F(CF_2)_z$ and z is 1, 2, 3 or 4; the product of formula $R_3OCF=CH_2$ in which $R_3$ is $F(CF_2)_z$— and z is 1, 2, 3 or 4; perfluorobutylethylene (PFBE); 3,3,3-trifluoropropene and 2-trifluoromethyl-3,3,3-trifluoro-1-propene.

The fluoropolymer may be a homopolymer or a copolymer; it may also include non-fluorinated monomers such as ethylene or propylene.

As an example, the fluoropolymer is chosen from:
homopolymers and copolymers of vinylidene fluoride (VDF, $CH_2=CF_2$) containing, by weight, at least 50% VDF. The VDF comonomer may be chosen from chlorotrifluoroethylene (CTFE), hexafluoropropylene (HFP), trifluoroethylene (VF3) and tetrafluoroethylene (TFE);
ethylene/TFE copolymers (ETFE);
homopolymers and copolymers of trifluoroethylene (VF3);
copolymers of the EFEP type, combining VDF with TFE (especially Daikin EFEPs);
copolymers, and especially terpolymers, combining the residues of chlorotrifluoroethylene (CTFE), tetrafluoroethylene (TFE), hexafluoropropylene (HFP) and/or ethylene units and optionally VDF and/or VF3 units.

Advantageously, the fluoropolymer is a PVDF homopolymer or copolymer. This is because such a fluoropolymer exhibits good chemical resistance, especially UV and chemical resistance, and can be easily converted (more easily than PTFE or ETFE type copolymers). Preferably, the PVDF contains, by weight, at least 50%, more preferably at least 75% and better still at least 85% VDF. The comonomer is advantageously HFP.

Advantageously, the PVDF has a viscosity ranging from 100 Pa·s to 4000 Pa·s, the viscosity being measured at 230° C. and a shear rate of 100 $s^{-1}$ using a capillary rheometer. This is because these PVDFs are well suited to extrusion and to injection moulding. Preferably, the PVDF has a viscosity ranging from 300 Pa·s to 1200 Pa·s, the viscosity being measured at 230° C. with a shear rate of 100 $s^{-1}$ using a capillary rheometer.

Thus, PVDFs sold under the brand name KYNAR® 710 or 720 are perfectly suitable for this formulation.

With regard to the unsaturated monomer, this possesses a C=C double bond, and at least one polar functional group that may be one of the following functional groups:
- a carboxylic acid;
- a carboxylic acid salt;
- a carboxylic acid anhydride;
- an epoxide;
- a carboxylic acid ester;
- a silyl;
- an alkoxysilane;
- a carboxylic amide;
- a hydroxyl;
- an isocyanate.

It is also possible to envisage using mixtures of several unsaturated monomers.

Unsaturated dicarboxylic acids having 4 to 10 carbon atoms and their functional derivatives, particularly their anhydrides, are particularly preferred unsaturated monomers. Mention may be made by way of examples of unsaturated monomers of methacrylic acid, acrylic acid, maleic acid, fumaric acid, itaconic acid, citraconic acid, undecylenic acid, allylsuccinic acid, cyclohex-4-ene-1,2-dicarboxylic acid, 4-methylcyclohex-4-ene-1,2-dicarboxylic acid, bicyclo[2.2.1]hept-5-ene-2,3-dicarboxylic acid, x-methylbicyclo-[2.2.1]hept-5-ene-2,3-dicarboxylic acid, zinc, calcium or sodium undecylenate, maleic anhydride, itaconic anhydride, citraconic anhydride, dichloromaleic anhydride, difluoromaleic anhydride, crotonic anhydride, glycidyl acrylate, glycidyl methacrylate, allyl glycidyl ether and vinylsilanes, such as vinyltrimethoxysilane, vinyltriethoxysilane, vinyltriacetoxysilane and γ-methacryloxypropyltrimethoxysilane.

Other examples of unsaturated monomers comprise $C_1$-$C_8$ alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; amide derivatives of unsaturated carboxylic acids, such as acrylamide, methacrylamide, the monoamide of maleic acid, the diamide of maleic acid, the N-monoethylamide of maleic acid, the N,N-diethylamide of maleic acid, the N-monobutylamide of maleic acid, the N,N-dibutylamide of maleic acid, the monoamide of fumaric acid, the diamide of fumaric acid, the N-monoethylamide of fumaric acid, the N,N-diethylamide of fumaric acid, the N-monobutylamide of fumaric acid and the N,N-dibutylamide of fumaric acid; imide derivatives of unsaturated carboxylic acids, such as maleimide, N-butylmaleimide and N-phenylmaleimide; and metal salts of unsaturated carboxylic acids, such as sodium acrylate, sodium methacrylate, potassium acrylate, potassium methacrylate and zinc, calcium or sodium undecylenate.

Excluded from unsaturated monomers are those that have two double bonds C=C, which could result in crosslinking of the fluoropolymer, such as for example diacrylates or triacrylates. From this point of view, maleic anhydride, just like zinc, calcium and sodium undecylenates constitute good graftable compounds as they have little tendency to homopolymerize or even to cause crosslinking.

Advantageously maleic anhydride is used. This unsaturated monomer has the following advantages:
- it is solid and can be easily introduced with the fluoropolymer granules before melt blending;
- it allows good adhesion properties to be obtained;
- it is particularly reactive with respect to functional groups on a functionalized polyolefin, especially when they are epoxide functional groups; and
- unlike other unsaturated monomers, such as (meth)acrylic acid or acrylic esters, it does not homopolymerize and does not have to be stabilized.

In the compound to be irradiated, the proportion of fluoropolymer by weight is between 80 and 99.9% per 0.1 to 20% of unsaturated monomer. Preferably, the proportion of fluoropolymer is from 90 to 99% per 1 to 10% of unsaturated monomer, respectively.

With regard to the polyolefin, this term denotes a polymer containing predominantly ethylene and/or propylene units. It may be a polyethylene homopolymer or copolymer, the comonomer being chosen from propylene, butene, hexene or octene. It may also be a polypropylene homopolymer or copolymer, the comonomer being chosen from ethylene, butene, hexene or octene.

The polyethylene may especially be high-density polyethylene (HDPE), low-density polyethylene (LDPE), linear low-density polyethylene (LLDPE) or very low-density polyethylene (VLDPE). The polyethylene may be obtained using a Ziegler-Natta, Phillips or metallocene-type catalyst or using the high-pressure process. The polypropylene is an isotactic or syndiotactic polypropylene.

It may also be a crosslinked polyethylene (denoted XPE). The crosslinked polyethylene may for example be a polyethylene containing hydrolysable silane groups (as described in applications WO 01/53367 or US20040127641 A1) which has then been crosslinked after the silane groups have reacted together. The reaction between the Si—OR silane groups results in Si—O—Si bonds that link the polyethylene chains together. The content of hydrolysable silane groups may be at least 0.1 hydrolysable silane groups per 100-$CH_2$— units (determined by infrared analysis). The polyethylene may also be crosslinked by radiation, for example gamma-radiation. It may also be a polyethylene crosslinked using a radical initiator of the peroxide type. It will therefore be possible to use a type-A XPE (crosslinking using a radical initiator), a type-B XPE (crosslinking using silane groups) or a type-C XPE (radiation crosslinking).

It may also be what is called a bimodal polyethylene, that is to say one composed of a blend of polyethylenes having different average molecular weights, as taught in document WO 00/60001. Bimodal polyethylene makes it possible for example to obtain a very advantageous compromise of impact and stress-cracking resistance, good rigidity and good pressure-withstand capability.

For pipes that have to be pressure-resistant, especially pipes for transporting pressurized gas or for transporting water, it may be advantageous to use a polyethylene that exhibits good resistance to slow crack growth (SCG) and to rapid crack growth (RCP). The HDPE XS 10 B grade sold by TOTAL PETROCHEMICALS exhibits good crack resistance (slow or rapid crack growth). This is an HDPE containing hexene as comonomer, having a density of 0.959 g/$cm^3$ (ISO 1183), an MI-5 of 0.3 dg/min (ISO 1133), an HLMI of 8 dg/min (ISO 1133), a long-term hydrostatic strength of 11.2 MPa according to ISO/DIS 9080, and a slow crack growth resistance on notched pipes of greater than 1000 hours according to ISO/DIS 13479.

With regard to the functionalized polyolefin, this term denotes a copolymer of ethylene with at least one unsaturated polar monomer chosen from:
- $C_1$-$C_8$ alkyl (meth)acrylates, especially methyl, ethyl, propyl, butyl, 2-ethylhexyl, isobutyl and cyclohexyl (meth)acrylate;

unsaturated carboxylic acids and the salts and anhydrides thereof, especially acrylic acid, methacrylic acid, maleic anhydride, itaconic anhydride and citraconic anhydride;

unsaturated epoxides, especially aliphatic glycidyl esters and ethers, such as allyl glycidyl ether, vinyl glycidyl ether, glycidyl maleate, glycidyl itaconate, glycidyl acrylate, glycidyl methacrylate, and alicyclic glycidyl esters and ethers; and vinyl esters of saturated carboxylic acids, especially vinyl acetate or vinyl propionate.

The functionalized polyolefin may be obtained by copolymerizing ethylene with at least one unsaturated polar monomer chosen from the above list. The functionalized polyolefin may be a copolymer of ethylene with a polar monomer of the above list or else a terpolymer of ethylene with two unsaturated polar monomers chosen from the above list. The copolymerization takes place at high pressure, above 1000 bar depending on the high-pressure process. The functional polyolefin obtained by copolymerization comprises 50 to 99.9%, preferably 60 to 99.9% and even more preferably 65 to 99% ethylene by weight and 0.1 to 50%, preferably 0.1 to 40% and even more preferably 1 to 35% by weight of at least one polar monomer from the above list.

By way of example, the functionalized polyolefin may be a copolymer of ethylene with an unsaturated epoxide, preferably glycidyl (meth)acrylate and optionally with a $C_1$-$C_8$ alkyl (meth)acrylate or a vinyl ester of a saturated carboxylic acid. The unsaturated epoxide, especially glycidyl (meth)acrylate, content by weight is between 0.1 and 50%, advantageously between 0.1 and 40%, preferably between 1 and 35% and even more preferably between 1 and 20%. For example, the functionalized polyolefins may be those sold by Arkema under the references LOTADER® AX8840 (8 wt % glycidyl methacrylate/92 wt % ethylene, with a melt index of 5 according to ASTM D1238), LOTADER® AX8900 (8 wt % glycidyl methacrylate/25 wt % methyl acrylate/67 wt % ethylene, with a melt index of 6 according to ASTM D1238) or LOTADER® AX8950 (9 wt % glycidyl methacrylate/15 wt % methyl acrylate/76 wt % ethylene, with a melt index of 85 according to ASTM D1238).

The functionalized polyolefin may also be a copolymer of ethylene with an unsaturated carboxylic anhydride, preferably maleic anhydride, and optionally with a $C_1$-$C_8$ alkyl (meth)acrylate or a vinyl ester of a saturated carboxylic acid. The content by weight of carboxylic acid anhydride, especially maleic anhydride, is between 0.1 and 50%, advantageously between 0.1 and 40%, preferably between 1 and 35% and even more preferably between 1 and 10%. For example, the functionalized polyolefins may be those sold by Arkema under the references LOTADER® 2210 (2.6 wt % maleic anhydride/6 wt % butyl acrylate/91.4 wt % ethylene, with a melt index of 3 according to ASTM D1238), a LOTADER® 3340 copolymer (3 wt % maleic anhydride/16 wt % butyl acrylate/81 wt % ethylene, with a melt index of 5 according to ASTM D1238), a LOTADER® 4720 copolymer (0.3 wt % maleic anhydride/30 wt % ethyl acrylate/69.7 wt % ethylene, with a melt index of 7 according to ASTM D1238), a LOTADER® 7500 (2.8 wt % maleic anhydride/20 wt % butyl acrylate/77.2 wt % ethylene, with a melt index of 70 according to ASTM D1238) or an OREVAC 9309, OREVAC 9314, OREVAC 9307Y, OREVAC 9318, OREVAC 9304 or OREVAC 9305 copolymer.

Also denoted by the term "functionalized polyolefin", is a polyolefin onto which an unsaturated polar monomer from the above list has been grafted by radical means. The grafting takes place in an extruder or in solution in the presence of a radical initiator. As examples or radical initiators, it will be possible to use tert-butyl hydroperoxide, cumene hydroperoxide, diisopropylbenzene hydroperoxide, di-tert-butyl peroxide, tert-butylcumyl peroxide, dicumyl peroxide, 1,3-bis-(tert-butylperoxyisopropyl)benzene, benzoyl peroxide, isobutyryl peroxide, bis(3,5,5-trimethylhexanoyl) peroxide or methyl ethyl ketone peroxide. The grafting of an unsaturated polar monomer onto a polyolefin is known to those skilled in the art, and for further details the reader may refer for example to documents EP 689505, U.S. Pat. No. 5,235,149, EP 658139, U.S. Pat. Nos. 6,750,288 B2 and 6,528,587 B2. The polyolefin onto which the unsaturated polar monomer has been grafted may be a polyethylene, especially high-density polyethylene (HDPE), low-density polyethylene (LDPE), linear low-density polyethylene (LLDPE) or very low-density polyethylene (VLDPE). The polyethylene may be obtained using a Ziegler-Natta, Phillips or metallocene-type catalyst or using the high-pressure process. The polyolefin may also be a polypropylene, especially an isotactic or syndiotactic polypropylene. It may also be a copolymer of ethylene and propylene of the EPR type, or a terpolymer of ethylene, propylene and a diene, of the EPDM type. It may be for example be one of the functionalized polyolefins sold by Arkema under the references OREVAC 18302, 18334, 18350, 18360, 18365, 18370, 18380, 18707, 18729, 18732, 18750, 18760, PP-C and CA100.

The polymer onto which the unsaturated polar monomer has been grafted may also be a copolymer of ethylene with at least one unsaturated polar monomer chosen from:

$C_1$-$C_8$ alkyl (meth)acrylates, especially methyl, ethyl, propyl, butyl, 2-ethylhexyl, isobutyl and cyclohexyl (meth)acrylates; and vinyl esters of saturated carboxylic acids, especially vinyl acetate or vinyl propionate.

It may for example be one of the functionalized polyolefins sold by Arkema under the references OREVAC 18211, 18216 or 18630. Preferably, the functionalized polyolefin is chosen in such a way that the functional groups on the unsaturated monomer which is grafted onto the fluoropolymer react with those on the polar monomer of the functionalized polyolefin. For example, if a carboxylic acid anhydride, for example maleic anhydride, is grafted onto the fluoropolymer, the layer of functionalized polyolefin may consist of a copolymer of ethylene with an unsaturated epoxide, for example glycidyl methacrylate, and optionally with an alkyl acrylate, the ethylene copolymer being optionally blended with a polyolefin.

According to another example, if an unsaturated epoxide, for example glycidyl methacrylate, has been grafted onto the fluoropolymer, the layer of functionalized polyolefin may consist of a copolymer of ethylene with a carboxylic acid anhydride, for example maleic anhydride, and optionally with an alkyl acrylate, the ethylene copolymer being optionally blended with a polyolefin.

The multilayer pipe and all its possible variants will now be described in greater detail. The multilayer pipe comprises (in the following order, from the inside of the pipe outwards):

optionally, a layer $C_1$ of a fluoropolymer;

a layer $C_2$ of a radiation-grafted fluoropolymer, optionally blended with a fluoropolymer;

optionally, an adhesion tie layer $C_3$, this layer $C_3$ being directly attached to the layer $C_2$ containing the radiation-grafted fluoropolymer;

a layer $C_4$ of a polyolefin, directly attached to the optional layer $C_3$ or else to the layer $C_2$;

optionally, a barrier layer $C_5$; and optionally, a layer $C_6$ of a polyolefin.

The internal layer, which is in contact with the fluid, is either the layer $C_1$, or the layer $C_2$. All the layers of the pipe are preferably concentric. The pipe is preferably cylindrical. Preferably, the layers adhere to one another in their respective contact zones (that is to say that two successive layers are directly attached to each other).

Advantages of the Multilayer Pipe

The multilayer pipe:

exhibits chemical resistance (via the layer $C_1$ and/or $C_2$) to the transported fluid;

stops the migration of contaminants from the external medium into the transported fluid;

stops the migration of contaminants present in the polyolefin of the layer $C_4$ and/or the layer $C_6$ into the transported fluid; and stops the migration of oxygen or additives present in the transported fluid into the layer $C_4$.

The Optional Layer $C_1$

This layer comprises at least one fluoropolymer (this fluoropolymer is not modified by radiation grafting). Preferably, the fluoropolymer is a PVDF homopolymer or copolymer or else a copolymer based on VDF and TFE, of the EFEP type.

The layer $C_2$

This layer comprises at least one radiation-grafted fluoropolymer. The radiation-grafted fluoropolymer serves as tie between the polyolefin layer and the fluoropolymer layer. Advantageously, the layer $C_2$ is directly attached to the layer $C_1$.

The radiation-grafted fluoropolymer of the layer $C_2$ may be used by itself or optionally blended with a fluoropolymer. The blend comprises in this case, by weight, from 1 to 99%, advantageously 10 to 90% and preferably 10 to 50% of a radiation-grafted fluoropolymer per 99 to 1%, advantageously 90 to 10% and preferably 50 to 90% of fluoropolymer (not modified by grafting), respectively.

Advantageously, the grafting-modified fluoropolymer used in the layer $C_2$ and the polymer not modified by radiation grafting used in $C_1$ and/or in $C_2$ are of the same nature. For example, these may be a PVDF modified by radiation grafting and an unmodified PVDF.

The Optional Layer $C_3$

The layer $C_3$, which is placed between the layer $C_2$ and the layer $C_4$, has the function of increasing the adhesion between these two layers. It comprises an adhesion tie, that is to say a polymer that improves the adhesion between the layers.

The adhesion tie is for example a functionalized polyolefin optionally blended with a polyolefin. In the case in which a blend is used, the latter comprises, by weight, from 1 to 99%, advantageously 10 to 90% and preferably 50 to 90% of a functionalized polyolefin per 99 to 1%, advantageously 90 to 10% and preferably 10 to 50% of polyolefin, respectively. The polyolefin that is used for the blend with the functionalized polyolefin is preferably a polyethylene, since these two polymers exhibit good compatibility. The layer $C_3$ may also comprise a blend of two or more functionalized polyolefins. For example, it may be a blend of a copolymer of ethylene with an unsaturated epoxide and optionally with an alkyl(meth)acrylate and an ethylene/alkyl (meth)acrylate copolymer.

The Layer $C_4$

The layer $C_4$ comprises at least one polyolefin optionally blended with a functionalized polyolefin.

In the case of a blend, this comprises, by weight, from 1 to 99%, advantageously 10 to 90% and preferably 10 to 50% of a functionalized polyolefin per 99 to 1%, advantageously 90 to 10% and preferably 50 to 90% of polyolefin, respectively. The polyolefin that is used for the blend with the functionalized polyolefin is preferably a polyethylene as these two polymers exhibit good compatibility.

Preferably, when a functionalized polyolefin is used for the layer $C_4$ or for the layer $C_3$ and when one of these layers is in direct contact with the layer $C_2$, the functionalized polyolefin is chosen so that it possesses functional groups capable of reacting with the functional groups grafted on the fluoropolymer. Thus, for example, if anhydride functional groups have been grafted onto the fluoropolymer, the functionalized polyolefin will advantageously contain epoxide or hydroxy functional groups. For example too, if epoxide or hydroxy functional groups have been grafted onto the fluoropolymer, the functionalized polyolefin will advantageously contain anhydride functional groups.

The internal layer which is in contact with the fluid is either the layer $C_1$ or the layer $C_2$.

The Optional Barrier Layer $C_5$

The function of the barrier layer is to prevent the diffusion of chemical compounds from outside the pipe into the pipe, or vice versa. For example it prevents the fluid from being contaminated by contaminants. Oxygen and chemicals, such as for example hydrocarbons, are contaminants. In the more specific case of gases, moisture may considered as a contaminant.

The barrier layer may be made of a barrier polymer, such as for example polydimethylketene. The polydimethylketene may be obtained by the pyrolysis of isobutyric anhydride as envisaged in applications FR 2 851 562 and FR 2 851 562 which is incorporated here for reference. A process for obtaining polydimethylketene is the following: a) a mixture comprising 1 to 50% by volume of isobutyric anhydride per 99 to 50% of an inert gas, respectively, is preheated at atmospheric pressure to between 300 and 340° C.; b) this mixture is then taken to a temperature of between 400 and 550° C. for a contact time of between 0.05 and 10 s, in order to obtain a mixture of dimethylketene, inert gas, isobutyric acid and unreacted isobutyric anhydride; c) the above stream is cooled in order to separate the dimethylketene and the inert gas from the isobutyric alcohol and the isobutyric anhydride; d) the dimethylketene is absorbed in a solvent of the saturated or unsaturated, aliphatic or alicyclic and substituted or unsubstituted hydrocarbon type, and then the polymerization of the dimethylketene is initiated using a cationic catalysis system soluble in this solvent and comprising an initiator, a catalyst and a cocatalyst; and e) at the end of the polymerization, the unreacted dimethylketene is removed and the polydimethylketene is separated from the solvent and from the residues of the catalysis system. The catalyst may for example be $AlBr_3$, the initiator is for example tert-butyl chloride and the cocatalyst is for example o-chloranil.

To improve the adhesion of the barrier layer $C_5$, a layer comprising an adhesion tie is advantageously placed between the barrier layer $C_5$ and the polyolefin layer $C_4$ and/or between the barrier layer $C_5$ and the optional polyolefin layer $C_6$.

The adhesion tie is for example a functionalized polymer that was described above. For example, it may be a functionalized polyolefin obtained by radical grafting. Advantageously, this is a polyolefin onto which a carboxylic acid or a carboxylic acid anhydride has been grafted, for example (meth)acrylic acid or maleic anhydride. It may therefore be a polyethylene onto which (meth)acrylic acid or maleic anhydride is grafted or a polypropylene onto which (meth) acrylic acid or maleic anhydride has been grafted. Examples of functionalized polyolefins that may be mentioned include those sold by Arkema under the references OREVAC 18302, 18334, 18350, 18360, 18365, 18370, 18380, 18707, 18729, 18732, 18750, 18760, PP-C, CA100 or by Uniroyal Chemical under the reference POLYBOND 1002 or 1009 (polyethylene onto which acrylic acid has been grafted).

The Optional Layer $C_6$

The pipe may optionally include a layer $C_6$ comprising at least one polyolefin. The polyolefins of the layers $C_4$ and $C_6$ may be identical or different. The layer $C_6$ is used to mechanically protect the pipe (e.g. against impacts on the pipe when it is installed), in particular to protect the layer $C_4$ or the barrier layer $C_5$ when the latter is present. It also makes it possible for the pipe as a whole to be mechanically reinforced, thereby making it possible to reduce the thicknesses of the other layers. To do this, the layer $C_6$ may include at least one reinforcing agent, for example a mineral filler.

Thanks to its good thermomechanical properties, XPE is used advantageously for the layer $C_4$ and/or for the layer $C_6$.

Each of the layers of the multilayer pipe, especially the polyolefin layer or layers, may contain usual additives blended into thermoplastics, for example antioxidants, lubricants, colorants, fire retardants, mineral or organic fillers, and antistatic agents such as, for example, carbon black or carbon nanotubes. The pipe may also include other layers, such as for example an external insulating layer.

Different Embodiments of the Pipe According to the Invention Will Now be Presented.

According to a 1st embodiment the pipe comprises (in the following order from the inside of the pipe outwards) a layer $C_2$ and, directly attached to the above layer, a layer $C_4$.

According to a 2nd embodiment, the pipe comprises (in the following order from the inside of the pipe outwards) a layer $C_1$, a layer $C_2$ and, directly attached to the above layer, a layer $C_4$.

According to a 3rd embodiment, the pipe comprises (in the following order from the inside of the pipe outwards) a layer $C_1$, a layer $C_2$, a layer $C_3$ directly attached to the layer $C_2$, a layer $C_4$ directly attached to the layer $C_3$, a layer $C_5$ and a layer $C_6$.

Example of a Pipe According to the 3Rd (Best) Embodiment $C_1$: PVDF homopolymer or copolymer;

$C_2$: PVDF homopolymer or copolymer onto which maleic anhydride has been radiation-grafted (using the process described above);

$C_3$: adhesion tie, preferably a functionalized polyolefin possessing functional groups capable of reacting with maleic anhydride, optionally blended with a polyolefin. Advantageously, this is a functionalized polyolefin possessing epoxide or hydroxy functional groups. For example, it may be a copolymer of ethylene, an unsaturated epoxide, for example glycidyl methacrylate, and optionally an alkyl acrylate;

$C_4$: polyethylene, preferably of the XPE type;

$C_5$: barrier layer; and $C_6$: polyethylene, preferably of the XPE type.

Preferably, an adhesion tie layer is placed between $C_5$ and $C_4$ and/or between $C_5$ and $C_6$. Preferably, the adhesion tie is a functionalized polyolefin.

Thickness of the Layers

Preferably, the layers $C_1$, $C_2$, $C_3$ and $C_5$ each have a thickness of between 0.01 and 30 mm, advantageously between 0.05 and 20 mm, preferably between 0.05 and 10 mm. The polyolefin layers $C_4$ and $C_6$ preferably each have a thickness of between 0.1 and 10 000 mm, advantageously between 0.5 and 2000 mm, preferably between 0.5 and 1000 mm.

Production of the Pipes

The pipe may be manufactured using the coextrusion technique. This technique relies on the use of as many extruders as there are layers to be extruded.

When the polyolefin of the layer $C_4$ and/or of the optional layer $C_6$ is a type-B XPE (crosslinking by silane groups), the process starts by extruding the uncrosslinked polyolefin. The crosslinking is carried out by immersing the extruded pipes in a bath of hot water in order to initiate the crosslinking. With an XPE of type-A (crosslinking using a radical initiator), the crosslinking is carried out using a radical initiator that is thermally activated during the extrusion. With an XPE of type-C, the process starts with all the layers being extruded, and then the pipe in its entirety is irradiated in order to initiate the crosslinking of the polyethylene. The irradiation is performed by means of an electron beam of 3 to 35 Mrad.

The invention also relates to a process for manufacturing the multilayer pipe having at least one layer of XPE of type-C, in which:

the various layers of the multilayer pipe are coextruded; and then the multilayer pipe thus formed is exposed to radiation in order to crosslink the polyethylene layer or layers.

Use of the Pipe

The multilayer pipe may be used for transporting different fluids.

The pipe is particularly appropriate for transporting hot water, in particular transporting mains hot water. The pipe may be used for transporting hot water for heating (the temperature above 60° C. or even 90° C.). One advantageous application example is that of radiant floor heating in which the pipe used for conveying the hot water is placed beneath the floor. The water is heated by a boiler and flows through the pipe. Another example is that in which the pipe serves to convey hot water to a radiator. The pipe can therefore be used for radiant water heating systems. The invention also relates to a network heating system comprising the pipe of the invention.

The chemical resistance of the pipe is adapted to water containing chemical additives (generally in small amounts, of less than 1%) which may impair polyolefins, especially polyethylene, in particular when hot. These additives may be oxidizing agents such as chlorine and hypochloric acid, chlorinated derivatives, bleach, ozone, etc.

For applications in which the water flowing in the pipes is a potable water, a water intended for medical or pharmaceutical applications, or a biological liquid, it is preferable to have a layer of an unmodified fluoropolymer as layer in contact with the water (layer $C_1$). Microorganisms (bacteria, germs, fungal growths, etc.) have little tendency to grow on a fluoropolymer, especially on PVDF. In addition, it is preferable for the layer in contact with the water or the biological liquid to be a layer of unmodified fluoropolymer, that a layer of modified fluoropolymer in order to prevent migration of ungrafted (free) unsaturated monomer into the water or the biological liquid.

The barrier properties of the pipe make it useable for transporting water in contaminated ground by stopping the migration of contaminants into the transported fluid. The barrier properties are also useful for preventing the migration of oxygen into the water (DIN 4726). This migration may be deleterious if the pipe is used for transporting hot heating water (the presence of oxygen is a source of corrosion of steel or iron components of the heating installation). It is also desirable to stop the migration of contaminants present in the polyolefin layer (antioxidants, polymerization residues, etc.) into the transported fluid.

More generally, the multilayer pipe can be used for transporting chemicals, especially those liable to chemically degrade polyolefins.

The multilayer pipe may also be used for transporting a gas, especially a pressurized gas. When the polyolefin is a polyethylene of the PE80 or PE100 type, it is especially suitable for withstanding pressures of greater than 10 bar, or greater than 20 bar or even greater than 30 bar. The gas may be of a different type. It may be for example:
- a gaseous hydrocarbon (for example town gas, a gaseous alkane, especially ethane, propane or butane, or a gaseous alkene, especially ethylene, propylene or butene);
- nitrogen;
- helium; hydrogen;
- oxygen;
- a corrosive gas or one capable of degrading polyethylene or polypropylene. For example, it may be an acid or corrosive gas, such as $H_2S$ or HCl or HF.

The advantage of these pipes for applications associated with air conditioning, in which the gas flowing in the pipes is a cryogen, will also be mentioned. The cryogen may be $CO_2$, especially supercritical $CO_2$, an HFC or an HCFC gas. The optional layer $C_1$ or else the layer $C_2$ exhibit good resistance to these gases, as it is a fluoropolymer. Preferably, the fluoropolymer of the layers $C_1$ and $C_2$ is PVDF, as it is particularly resistant. It is possible for the cryogen to condense at certain points in the air-conditioning circuit and to be liquid. The multilayer pipe can therefore also apply to the case in which the cryogenic gas has condensed in the form of liquid.

EXAMPLES

Preparation of the Modified KYNAR® 720

A blend of KYNAR® 720 PVDF from Arkema and 2 wt % maleic anhydride was prepared. This blend was prepared using a twin-screw extruder operating at 230° C. and 150 rpm and with a throughput of 10 kg/h. The granulated product thus prepared was bagged in aluminium-lined bags and then the oxygen was removed by purging with a stream of argon. The bags were then irradiated by gamma-radiation (cobalt 60 bomb) to 3 Mrad (10 MeV acceleration) for 17 hours. A grafting content of 50% was determined, this content being verified after a step of dissolving in N-methylpyrrolidone followed by precipitation in a water/THF (50/50 by weight) mixture. The product obtained after the grafting operation was then placed in a vacuum overnight at 130° C. in order to remove the residual maleic anhydride and the hydrofluoric acid released during the irradiation. The final content of grafted maleic anhydride was 1% (by infrared spectroscopy on the C=O band at around 1870 $cm^{-1}$).

Preparation of a Multilayer Pipe

A pipe having the following structure was manufactured using the coextrusion technique: modified KYNAR® 720 (300 μm)/LOTADER® AX 8840 (100 μm)/XPE (2600 μm). The XPE layer was the external layer. The LOTADER acted as an adhesion tie between the modified PVDF and the XPE. All the layers adhered to one another in the order indicated.

The pipe was obtained by coextruding a layer of polyethylene modified by silane groups (extrusion temperature around 230° C.), a layer of LOTADER® AX8840 (extrusion temperature around 250° C.) and a layer of a KYNAR® 720 onto which 1 wt % maleic anhydride was radiation-grafted (extrusion temperature around 250° C.). The extruder used was a McNeil extruder. The temperature of the coextrusion head was 265° C. and the die temperature was 250° C. The respective thicknesses of the layers were (for a pipe of 32 mm outside diameter) 2.6 mm of XPE, 100 μm of LOTADER® AX8840 and 300 μm of modified KYNAR® 720.

The polyethylene layer was obtained by extruding a masterbatch containing 95% of BORPEX® ME 2510 grade from Borealis and 5% of MB 51 from Borealis. The adhesion between the layers five days after the extrusion was measured to be 50 N/cm. The pipe was placed in a hot water tank at 60° C. for 72 h in order to form the XPE. The gel content obtained on the pipe was measured by a dissolution technique to be 75% of gel content.

What is claimed is:

1. A coextruded multilayer pipe consisting (in the following order, from the inside of the pipe outwards):
   - a layer $C_1$ of a vinylidene fluoride homopolymer or copolymer having at least 75% by weight of vinylidene fluoride (VDF);
   - layer $C_2$ a radiation grafted vinylidene fluoride homopolymer or copolymer onto which maleic anhydride has been radiation-grafted by melt-blending said vinylidene fluoride homopolymer or copolymer and said maleic anhydride, forming granules of said blend, followed by irradiation grafting of said granules in the solid state—said grafting taking place when the polymer is not in the melt state, wherein said grafting occurs throughout the mass and not just on the surface of a powder, and wherein the level of grafting is from 0.9 to 5%;
   - an adhesion tie layer $C_3$, this layer $C_3$ being directly attached to the layer $C_2$ containing the radiation-grafted fluoropolymer;
   - a layer $C_4$ selected from the group consisting of a polyethylene and a polyolefin blended with a functionalized polyolefin, directly attached to the layer $C_3$;
   - a polymer barrier layer $C_5$ to prevent diffusion of chemical compounds; and
   - a polyethylene layer $C_6$.

2. The multilayer pipe according to claim 1, in which the layers adhere to one another in their respective contact regions.

3. The multilayer pipe according to claim 1, in which the fluoropolymer of the layer $C_1$ and/or of the layer $C_2$ is a polymer having, in its chain, at least one monomer chosen from compounds containing a vinyl group capable of opening, in order to be polymerized, and containing, directly attached to this vinyl group, at least one fluorine atom, one fluoroalkyl group or one fluoroalkoxy group.

4. The multilayer pipe according to claim 1, in which the adhesion tie layer is a functionalized polyolefin optionally blended with a polyolefin.

5. The multilayer pipe according to claim 4, in which the functionalized polyolefin possesses functional groups capable of reacting with the functional groups grafted onto the fluoropolymer.

6. The multilayer pipe according to claim 1, in which the polyolefin layer $C_4$ is an cross-linked polyethylene (XPE).

7. The multilayer pipe according to claim 4, in which the functionalized polyolefin possesses epoxide or hydroxy functional groups.

8. The multilayer pipe according to claim 4, in which the functionalized polyolefin is a copolymer of ethylene, and an unsaturated epoxide.

9. The multilayer pipe of claim 1 comprising a fluid transport system for transporting water, hot water, chemicals or a gas.

10. The multilayer pipe of claim 9 comprising a fluid transport system for conveying hot water in an under-floor radiant heating system or for conveying hot water to a radiator.

11. The multilayer pipe of claim 9 comprising a fluid transport system in radiant heating systems.

12. The multiplayer pipe of claim 9 comprising a fluid transport system wherein the gas is a gaseous hydrocarbon, nitrogen, helium, hydrogen, oxygen, a corrosive gas or a gas capable of degrading polyethylene or polypropylene, or a cryogen.

13. The multilayer pipe according to claim 1, in which the vinylidene fluoride copolymer of the layer $C_1$ and/or of the layer $C_2$ is a VDF copolymer containing at least 75% VDF by weight.

14. The multilayer pipe according to claim 8, in which the functionalized polyolefin is a copolymer of ethylene, an unsaturated epoxide, and an alkyl acrylate.

15. The multilayer pipe of claim 1, wherein said barrier layer comprises polydimethylketene.

* * * * *